United States Patent
Rose et al.

(10) Patent No.: US 8,145,787 B1
(45) Date of Patent: Mar. 27, 2012

(54) ADAPTIVE BANDWIDTH UTILIZATION OVER FABRIC LINKS

(75) Inventors: Kenneth Rose, Palo Alto, CA (US); Mick Jacobs, Auburn, CA (US); Jatin Batra, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1180 days.

(21) Appl. No.: 09/978,475

(22) Filed: Oct. 16, 2001

(51) Int. Cl.
*G06F 15/16* (2006.01)

(52) U.S. Cl. ...................................................... 709/235

(58) Field of Classification Search .................. 370/229, 370/235, 412, 468, 236, 232, 371, 369, 230, 370/231; 709/235; 710/34, 52, 240
See application file for complete search history.

(56) References Cited

U.S. PATENT DOCUMENTS

| | | | | |
|---|---|---|---|---|
| 705,110 A * | 7/1902 | Moritz | | 165/102 |
| 3,775,566 A | 11/1973 | Akimaru et al. | | 179/18 |
| 5,163,046 A * | 11/1992 | Hahne et al. | | 370/237 |
| 5,179,552 A | 1/1993 | Chao | | 370/60 |
| 5,197,064 A | 3/1993 | Chao | | 370/60 |
| 5,197,127 A * | 3/1993 | Waclawsky et al. | | 709/224 |
| 5,361,255 A | 11/1994 | Diaz et al. | | 370/58.1 |
| 5,539,747 A * | 7/1996 | Ito et al. | | 370/235 |
| 5,673,253 A | 9/1997 | Shaffer | | 370/229 |
| 5,838,690 A * | 11/1998 | Kano et al. | | 370/468 |
| 6,046,983 A * | 4/2000 | Hasegawa et al. | | 370/236.1 |
| 6,091,729 A | 7/2000 | Dove | | 370/395 |
| 6,094,692 A | 7/2000 | Kalkunte | | 710/34 |
| 6,118,761 A * | 9/2000 | Kalkunte et al. | | 370/229 |
| 6,122,251 A * | 9/2000 | Shinohara | | 370/231 |
| 6,138,189 A * | 10/2000 | Kalkunte | | 710/53 |
| 6,144,636 A * | 11/2000 | Aimoto et al. | | 370/229 |
| 6,147,997 A * | 11/2000 | Holden et al. | | 370/395.1 |
| 6,157,643 A | 12/2000 | Ma | | 370/389 |
| 6,167,030 A | 12/2000 | Kikki et al. | | 370/236 |
| 6,252,848 B1 * | 6/2001 | Skirmont | | 370/229 |
| 6,356,548 B1 | 3/2002 | Nellenbach et al. | | 370/362 |
| 6,445,707 B1 * | 9/2002 | Iuoras et al. | | 370/395.43 |
| 6,487,211 B1 * | 11/2002 | Yamaguchi | | 370/412 |
| 6,515,963 B1 * | 2/2003 | Bechtolsheim et al. | | 370/229 |
| 6,636,949 B2 | 10/2003 | Barroso et al. | | 711/141 |
| 6,687,254 B1 * | 2/2004 | Ho et al. | | 370/412 |
| 6,700,869 B1 | 3/2004 | Falco et al. | | 370/230 |
| 6,715,007 B1 | 3/2004 | Williams et al. | | 710/52 |
| 6,724,776 B1 * | 4/2004 | Jeffries | | 370/468 |
| 6,732,209 B1 | 5/2004 | Cherukuri et al. | | 710/240 |
| 6,839,768 B2 | 1/2005 | Ma et al. | | 709/235 |
| 6,870,854 B1 * | 3/2005 | Aimoto et al. | | 370/412 |
| 6,907,001 B1 * | 6/2005 | Nakayama et al. | | 370/230 |

(Continued)

*Primary Examiner* — Karen Tang
(74) *Attorney, Agent, or Firm* — Campbell Stephenson LLP

(57) ABSTRACT

Disclosed is a method and apparatus for adapting bandwidth utilization over fabric links. In one embodiment of the method, a transmitting device transmits data at a first non-zero rate to a memory for storage therein during a first period of time. The transmitting device then transmits data at a second non-zero rate to the memory for storage therein during a second period of time. The second period of time is subsequent to the first period of time, and the second non-zero rate is greater than or less than the first non-zero rate. This method may find application in switching network where the transmitting device is contained in a switching fabric, the memory is a FIFO buffer contained in a line card coupled to the switching fabric via a data link, and where the transmitter transmits data via the data link to the FIFO buffer for storage therein.

24 Claims, 6 Drawing Sheets

U.S. PATENT DOCUMENTS

| | | | |
|---|---|---|---|
| 6,937,568 B1 | 8/2005 | Nicholl et al. | 370/236 |
| 6,990,073 B1* | 1/2006 | Sandoval | 370/232 |
| 7,051,110 B2* | 5/2006 | Hagai et al. | 709/231 |
| 7,068,602 B2 | 6/2006 | Davari et al. | 370/232 |
| 7,072,299 B2* | 7/2006 | Bass et al. | 370/235 |
| 7,145,904 B2 | 12/2006 | Zhao et al. | 370/371 |
| 7,298,703 B1 | 11/2007 | Rose | 370/236 |
| 2001/0050913 A1* | 12/2001 | Chen et al. | 370/360 |
| 2002/0048280 A1* | 4/2002 | Lee et al. | 370/468 |
| 2002/0057712 A1 | 5/2002 | Moriwaki et al. | 370/463 |
| 2002/0176357 A1* | 11/2002 | Lay | 370/229 |
| 2002/0188648 A1* | 12/2002 | Aweya et al. | 709/102 |
| 2003/0007452 A1* | 1/2003 | Gorti et al. | 370/229 |
| 2003/0016686 A1* | 1/2003 | Wynne et al. | 370/412 |
| 2003/0035373 A1* | 2/2003 | Bass et al. | 370/230.1 |
| 2003/0128703 A1 | 7/2003 | Zhao et al. | 370/392 |
| 2003/0165150 A1 | 9/2003 | Zimmermann et al. | 370/412 |
| 2003/0231593 A1 | 12/2003 | Bauman et al. | 370/235 |
| 2004/0004961 A1 | 1/2004 | Lakshmanamurthy et al. | 370/364 |
| 2004/0085967 A1 | 5/2004 | Boduch et al. | 370/395.42 |
| 2005/0163139 A1* | 7/2005 | Robotham et al. | 370/412 |
| 2005/0226149 A1* | 10/2005 | Jacobson et al. | 370/229 |
| 2006/0233102 A1* | 10/2006 | Kusumoto | 370/229 |

* cited by examiner

ADAPTIVE BANDWIDTH UTILIZATION OVER FABRIC LINKS

BACKGROUND OF THE INVENTION

Local switching networks (e.g., a switching network contained within an office building) may include a switching fabric connecting end devices via line cards. The term switching fabric is a term that describes a distributed switching matrix that establishes a circuit through which data may be transmitted between end devices. A switching fabric may include a stored program control that seeks out a suitable combination of time-slots and multiplexed highways to establish the circuit between the end devices. Multiple highways can co-exist simultaneously being exclusive from/to end devices. The term end device may include desktop computers, printers, routers, or other networking equipment, etc.

FIG. 1a illustrates, in block diagram form, an exemplary local switching network 100. Local switch network 100 includes a switching fabric 102 (e.g., a cross-bar switching fabric) coupled to line cards 104 through 108. Each of the line cards may be coupled to one or more end devices or other networks. FIG. 1a shows line card 104 coupled to end devices 110 through 114 via common bus 140, line card 106 coupled to end devices 116 through 120 via common bus 142, and line card 108 coupled to end devices 122 through 126 via common bus 144.

The local switching network 100 shown in FIG. 1a may employ one of many different communication protocols enabling data communication between one or more end devices 110 through 126 via line cards 104 through 108 and switching fabric 102. FIG. 1a will be described with reference to a communications protocol in which end devices communicate by transferring variable sized data frames or packets to each other via line cards and the switching fabric. Each data packet includes one or more lines of data. The lines of the data packet may be transmitted during consecutive data transmission cycles of the link between the line card and the switching fabric. Lines of the data packet may also be transmitted during non-consecutive transmission cycles of the link between the line card and the switching fabric. Line cards 104 through 108 are coupled to switching fabric 102 via one or more data links. In FIG. 1a, line card 104 is coupled switching fabric 102 via downlink and uplink 128 and 130, respectively, line card 106 is coupled switching fabric 102 via downlink and uplink 132 and 134, respectively, and line card 108 is coupled switching fabric 102 via downlink and uplink 136 and 138, respectively.

FIG. 1b illustrates in block diagram form, relevant portions of a line card 104. As shown in FIG. 1b, line card 104 includes a receiving data buffer 150, a formatter 152, a control circuit 154, and a multiplexer 156. Multiplexer 156 selectively couples an output of formatter 152 and common bus 140 to uplink 130 in response to a control signal generated by control circuit 154. Formatter generates control codes to be transmitted to switching fabric 102. Control circuit couples the output of formatter 152 to uplink 132 in response to formatter generating a control code. Otherwise, control circuit 154 couples common bus 140 to uplink 130 thereby allowing data to be transmitted to switching fabric 102. It is noted lines of data received in line cards are optionally modified by a separate formatter (not shown) before being sent through the multiplexer 156 to fabric 102. For example, the first line of each packet may be modified before passing through the multiplexer 156.

Data buffer 150 typically is a first in first out (FIFO) buffer. Buffer 150 is configured to receive and store lines of data received from switching fabric 102 via downlink 128. The data is stored within buffer 150 until it is transmitted to one of the end devices 110 through 114 (not shown in FIG. 1b) via common bus 140. Common bus 140 may take form in a bi-directional bus. In this embodiment, a switch may be provided (not shown) for selectively coupling the data buffer 150 or the multiplexer 156 to the bi-directional bus. In the alternative, common bus 140 may take form in a pair of unidirectional buses respectively coupled to buffer 150 and multiplexer 156.

Formatter 152 provides a plurality of functions. One function is to monitor buffer 150. Often times, buffer 150 cannot output data to end devices 110 through 114 as fast as data is input to buffer 150 from switching fabric. In this situation, buffer 150 may completely fill as new data is sent from switching fabric 102 for storage therein. Because the buffer has no room for storing the new data, the new data may be lost.

Formatter 152 monitors the quantity of data stored in buffer 150 on an ongoing basis. To this end, formatter 152 receives information from data buffer 150 which identifies the quantity of data stored therein. Formatter compares this data against a single programmable threshold value (e.g., 80% of the full storage capacity of buffer 150). If the quantity of data stored in buffer 150 exceeds this threshold value, formatter 152 generates a control code instructing the switching fabric 102 to stop transmitting data for storage in buffer. Once generated, the stop-transmit control code is transmitted to switching fabric via multiplexer 156 and uplink 130. The switching fabric 102 stops sending data to line card 104 for storage in buffer 150 in response to receiving the stop-transmit control code, thereby decreasing the chances of buffer 150 overflow. However, it is noted that switching fabric may continue to send new data to line card 104 until the switching fabric receives the stop-transmit control code.

As buffer 150 outputs data to one of the end devices 110 through 114 while the switching fabric is in stop-transmit mode of operation, the quantity of data stored therein will decrease. Eventually, formatter eventually will generate a control code instructing the switching fabric to start transmitting data to line card 104. This start-transmit control code will be generated in response to formatter receiving information from buffer 150 that the quantity of data stored therein is less than the single threshold value. The start-transmit control code is transmitted to switching fabric 102 via multiplexer 156 and uplink 130. When the start-transmit control code is received by the switching fabric 102, switching fabric starts to transmit data at the full rate to line card 104 for storage in buffer 104.

Thus, in the system shown in FIGS. 1a and 1b, data transmitted by switching fabric 102 is controlled by a simple stop/start control code received from formatter 152; either data is received within data buffer 150 at the full data transmit rate or no data is received at all.

Substantial problems exist with the above-described method of monitoring buffers in line cards. One problem relates to the delay period between the time when formatter 152 detects that the quantity of data in buffer 150 exceeds the single threshold value and the time when switching fabric 102 stops transmitting data in response to receiving the stop transmit control code. During this delay period, switching fabric continues to transmit data at the full rate for storage in buffer 150. If the single threshold value is not set low enough, then a risk exists that buffer 150 may completely fill resulting in the loss of some of the data transmitted during the delay period. To avoid this, the single threshold value is set relatively low, or, if the single threshold value is not set relatively low, the size of the buffer is increased. Either solution to the problem results in an inefficient use of buffer memory.

Another problem relates to the initial setting of the full rate at which data is transmitted over fabric interface 128 to line card 104. The full rate is a setting that must be guessed. A guess too high may lead to frequent generation of stop/start transmit control codes, while a guess too low may lead to an underutilization of the available data transmission bandwidth between switching fabric 102 and line card 104.

SUMMARY OF THE INVENTION

Disclosed is a method and apparatus for adapting bandwidth utilization over fabric links. In one embodiment of the method, a transmitting device transmits data at a first non-zero rate to a memory for storage therein during a first period of time. The transmitting device then transmits data at a second non-zero rate to the memory for storage therein during a second period of time. The second period of time is subsequent to the first period of time, and the second non-zero rate is greater than or less than the first non-zero rate. This method may find application in switching network where the transmitting device is contained in a switching fabric, the memory is a FIFO buffer contained in a line card coupled to the switching fabric via a data link, and where the transmitter transmits data via the data link to the FIFO buffer for storage therein.

BRIEF DESCRIPTION OF THE DRAWINGS

The present invention may be better understood, and it's numerous objects, features and advantages made apparent to those skilled in the art by referencing the accompanying drawings. The use of the same reference number throughout the figures designates a like or similar element.

FIG. 1b illustrates, in block diagram form, an exemplary line card employed in the local switching network of FIG. 1a;

FIG. 2b illustrates, in block diagram form, an exemplary line card employed in the local switching network of FIG. 2a;

FIG. 2c illustrates, in block diagram form, an exemplary line card employable in the local switching network of FIG. 1a;

FIG. 3 illustrates, in block diagram form, an exemplary formatter employed in the line card of FIG. 2a;

Figure 1A:
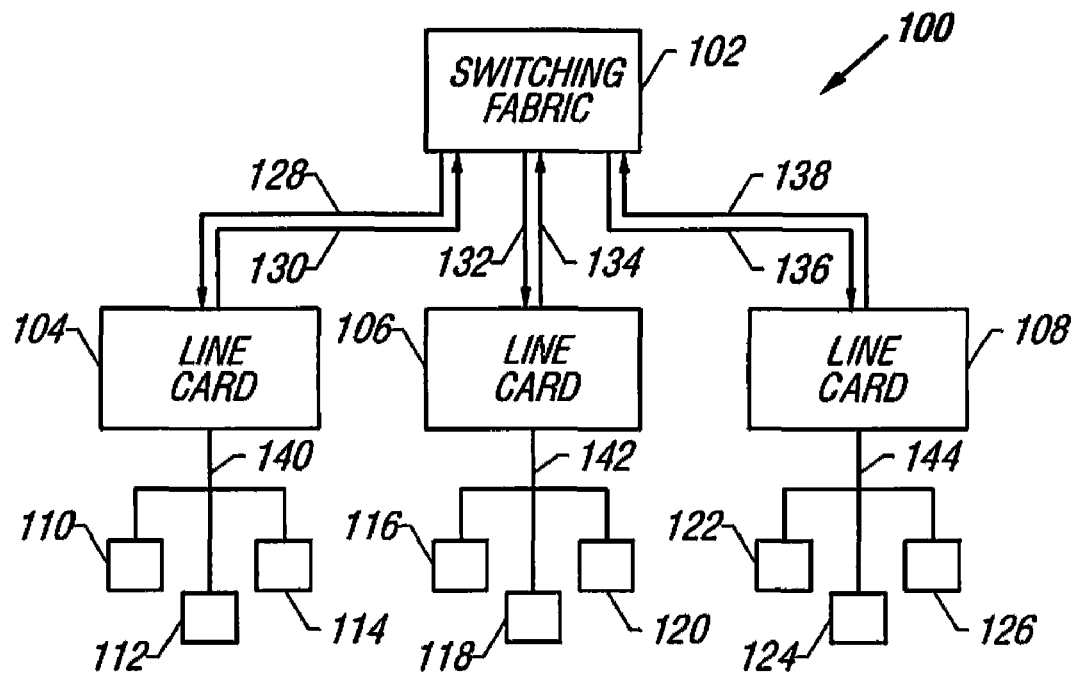
FIG. 1a illustrates, in block diagram form, an exemplary local switching network.
Figure 1B:
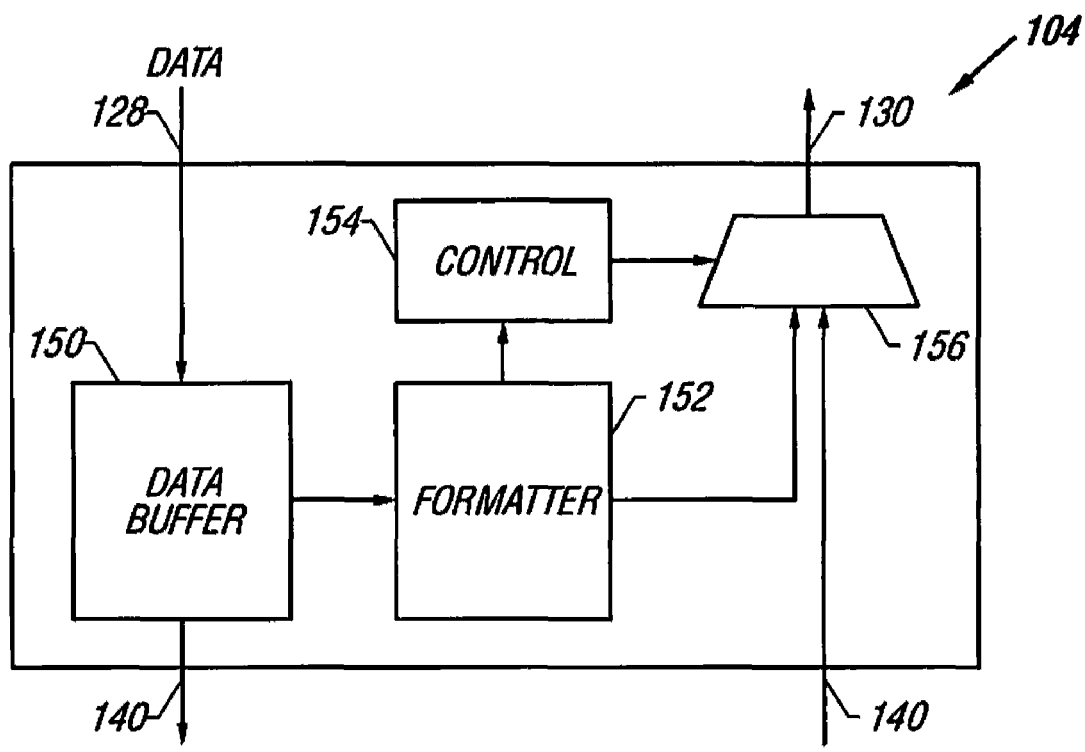

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the spirit and scope of the present invention as defined by the appended claims.

DETAILED DESCRIPTION

Figure 2A:
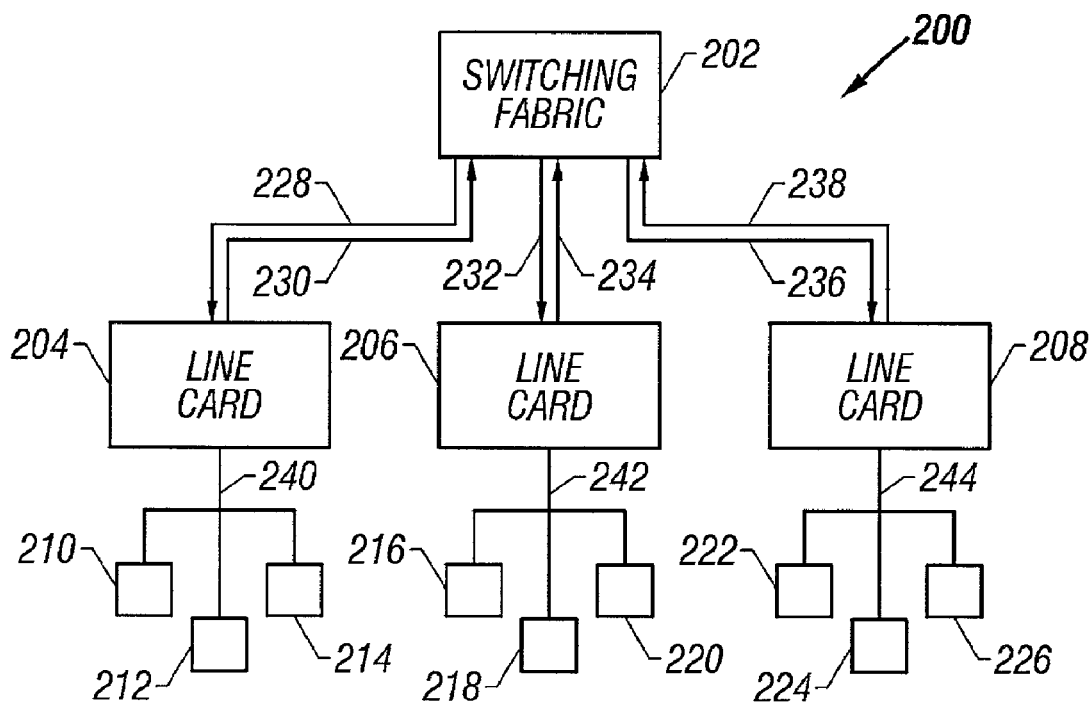
FIG. 2a illustrates, in block diagram form, an exemplary local switching network employing the present invention.

FIG. 2a illustrates, in block diagram form, a local switching network 200 employing the present invention. Local switch network 200 includes a switching fabric 202 (e.g., a cross-bar switching fabric) coupled to line cards 204 through 208. Line card 204 is coupled to end devices 210 through 214, line card 206 is coupled to end devices 216 through 220, and line card 208 is coupled to end devices 224 through 226.

The local switching network 200 shown in FIG. 2a may employ one of many different communication protocols enabling data communication between one or more end devices 210 through 226 via line cards 204 through 208 and switching fabric 202. FIG. 2a will be described with reference to a communications protocol in which end devices communicate with each other by transferring variable sized data frames or packets via line cards and the switching fabric. It is noted end devices (e.g., end devices 210 and 212) can locally communicate with each other without having to transmit data packets via fabric 202. The present invention will be described with reference to end devices communicating with each other via fabric 202.

Each data packet in a data communication includes one or more lines of data. The lines of the data packet may be transmitted during consecutive data transmission cycles of the link between the line card and the switching fabric. Lines of the data packet may also be transmitted during non-consecutive transmission cycles of the link between the line card and the switching fabric.

Line cards 204 through 208 are coupled to switching fabric 202 via one or more data links. In FIG. 2a, line card 204 is coupled switching fabric 202 via downlink and uplink 228 and 230, respectively, line card 206 is coupled switching fabric 202 via downlink and uplink 232 and 234, respectively, and line card 208 is coupled switching fabric 202 via downlink and uplink 236 and 238, respectively. Data is transferred between line card 204 and end devices 210 through 214 via common bus 240, between line card 206 and end devices 216 through 220 via common bus 242, and between line card 208 and end devices 222 through 226 via common bus 244.

Figure 2B:
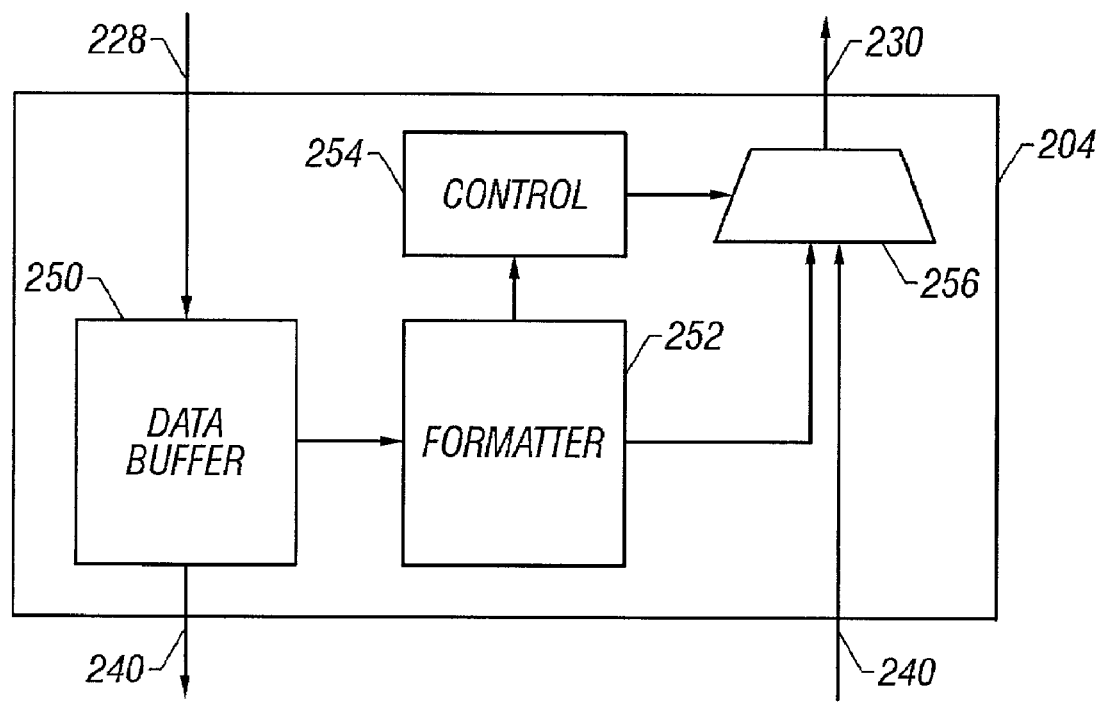

FIG. 2b illustrates in block diagram form one embodiment of line card 204. Line cards 206 and 208 may take similar form. In FIG. 2b, line card 204 includes a data buffer 250, a formatter 252, a control circuit 254, and a multiplexer 256. Multiplexer 256 selectively couples an output of formatter 252 and common bus 240 to uplink 230 in response to a control signal generated by control circuit 254. Formatter 252 generates control codes to be transmitted to switching fabric 202. Although not shown, a separate formatter may be present in line card 204. The separate formatter may be provided to modify the first line of one or more data packets of a stream received from common bus 240 before the data packets are transmitted to the fabric via multiplexer 256. Control circuit couples the output of formatter 252 to uplink 232 in response to formatter 252 generating a control code. Otherwise, control circuit 254 couples common bus 240 to uplink 230 thereby allowing data input to line card 204 to be transmitted to switching fabric 202. Common bus 240 may take form in a bi-directional bus. In this embodiment, a switch may be provided (not shown) for selectively coupling the data buffer 250 or the multiplexer 256 to the bi-directional bus. In the alternative, common bus 240 may take form in a pair of unidirectional buses respectively coupled to buffer 250 and multiplexer 256.

Data buffer 250 may take form in a FIFO buffer. Buffer 250 is configured to receive and store data transmitted from switching fabric 202 via downlink 228. Data is stored within data buffer 215 prior to output on to common bus 240 for subsequent delivery to one of the end devices 210 through 214. Although not shown, a second buffer may be present in line card 204. The second buffer may store data packets received from common bus 240 before they are transmitted to fabric 202 via multiplexer.

Data buffer, in one embodiment, may include circuitry for generating information relating to the quantity of data stored therein. This information may be generated in any one of a number of different methods. For example, circuitry in buffer 250 may keep a running total of the data lines input to buffer and a running total of the data lines output from buffer 250. During each cycle of a system clock (not shown in FIG. 2*b*) the circuitry may subtract the running total of data lines output from the running total of data lines input, the difference provided to formatter 252 as q(t), the quantity of data stored in buffer 250 at time t. Alternatively, buffer 250 may provide the running totals to formatter 252 for subsequent calculation of q(t).

Formatter 252 is configured to receive the information relating to the quantity of data stored within buffer 250. For purposes of explanation, formatter 252 will be described as receiving q(t). In one embodiment, formatter 252 receives q(t) at each cycle of the system clock. Formatter 252 is configured to generate a plurality of control codes for transmission to switching fabric 202 via multiplexer 256 and uplink 230. As will be more fully described below, one of the control codes, a variable data transmit rate control code (hereinafter referred to as variable-rate control code), variably controls the rate at which data is transmitted from switching fabric 202 for storage within data buffer 250. In contrast to the prior art described above, formatter 252, through generation and transmission of the variable-rate control code, may vary the rate at which data is transmitted to buffer 250. The rate may vary from a full data transmit rate to zero data transmit rate, and at rates therebetween. For example, formatter 252 may generate a variable-rate control code instructing switching fabric 202 to transmit data at 0%, 12.5%, 25%, . . . 100% of the full rate. Formatter 252 generates the variable-rate control code in response to receiving q(t). Accordingly, line card 204 may signal switching fabric 202 the status of its data buffer 250 by adjusting the rate at which data is transmitted to buffer 250 for storage therein. In one embodiment, the variable-rate control codes are fixed. In another embodiment, the variable-rate control codes are programmable. In this latter embodiment, the variable-rate control codes may be set by software operating in, for example, formatter 252.

Formatter 252 monitors the quantity of data stored within buffer 250 using q(t) provided therefrom. Although not shown in FIG. 2*b*, circuitry for monitoring buffer 250 in formatter 252 may take form in hardware, software, or a combination of hardware and software. Formatter 252, in one embodiment, compares q(t) against several programmable thresholds Q(1)-Q(n) during each cycle of the system clock provided to line card 204. Thresholds Q(1)-Q(n) represent increasing quantities of data ranging from Q(1) equal to zero to Q(n) equal to a percentage (e.g., 98%) of the total amount of data capable of being stored in buffer 250. When q(t) increases beyond any of the thresholds Q(1)-Q(n), then at that time formatter 252 generates and sends a variable-rate control code to switching fabric 202 instructing it to slow the rate at which it transmits data for storage in buffer 250. Before the variable-rate control code is sent, control 254 instructs multiplexer 256 to couple formatter 252 to uplink 230. Once the variable-rate control code is transmitted to fabric 202, control 254 instructs multiplexer to couple uplink 230 to common bus 240. Conversely, when q(t) decreases below any of the programmable thresholds Q(1)-Q(n), then formatter 252 at that time generates and sends a variable-rate control code to switching fabric 202 instructing it to increase the rate at which it transmits data for storage in buffer 250. Thus, for example, if there is a burst of locally switched traffic on bus 240 such that data buffer 250 cannot empty its contents quickly and data buffer 250 begins to fill up, formatter 252 may generate one or more variable-rate control codes instructing switching fabric 202 to lower its data transmit rate one or more times. In this fashion, the data transmit rate is adjusted to the maximum sustainable level. It is noted that in this context, maximum sustainable level does not necessarily equate to 100% of the full transmit rate. When the local burst subsides, data can flow out of buffer 250 at a rate greater than the rate at which buffer 250 receives data, thereby lowering the quantity of data stored within data buffer 250. In response, formatter 252 may generate one or more variable-rate control codes instructing switching fabric 202 to increase its data transmit rate one or more times. In this fashion, the data transmit rate is again adjusted to the maximum sustainable level.

Thus, in contrast to the prior art, should line card 204 be unable to accept high data rates, the data transmit rate will quickly lower to a sustainable rate instead of continuously cycling the fabric with start/stop control codes. In this configuration, in contrast to the prior art, no guess need be made as to the initial rate at which data is transferred to line card 204. Rather, as buffer 250 begins to backup with data, formatter 252 will send one or more variable-rate control codes to the switching fabric 202 instructing it to lower its data transmit rate one or more times. As the buffer 250 empties, formatter 252 will send one or more variable-rate control codes to switching fabric 202 instructing it to increase its data transmit rate one or more times.

The present invention is described above as being embodied in line a card. The present invention should not be limited thereto. The present invention may be embodied in any device that has a buffer for temporarily storing data received from some transmitting device. For example, the present invention may be embodied in switching fabric 202. Although not shown in the figures, switching fabric 202 may include first, second, and third input FIFO buffers for receiving and storing data from line cards 204, 206, and 208, respectively. Switching fabric 202 may include one or more formatters configured to generate and send control codes, including variable-rate control codes, to line cards 204 through 208. For purposes of explanation, switching fabric 202 will be described as having one formatter capable of generating and sending first, second, and third variable-rate control codes to line cards 204 through 208, respectively, for variably controlling the rate at which line cards 204 through 208 transmit data to switching fabric 202 for storage in respective buffers thereof.

Like the variable-rate control codes generated by formatter 252, the formatter of switching fabric 202 may generate the first, second, and third variable-rate control codes after comparing the quantity of data stored in the buffers against programmable thresholds. For purposes of explanation, the first, second, and third buffers of switching fabric 202 generate qa(t), qb(t), and qc(t) representing the quantity of data stored in the first, second, and third buffers, respectively, at time t. In this explanatory embodiment, the switching fabric formatter may compare qa(t), qb(t), and qc(t) against programmable thresholds Qa(1)-Qa(n), Qb(1)-Qb(n), and Qc(1)-Qc(n), respectively. When qa(t), qb(t), or qc(t) increases beyond any of the programmable thresholds Qa(1)-Qa(n), Qb(1)-Qb(n), or Qc(1)-Qc(n), respectively, then at that time formatter 252 generates and sends the first, second, or third variable-rate control code to line cards 204, 206, or 208 respectively, instructing it to slow the rate at which it transmits data for storage in the first, second, or third buffer, respectively, of switching fabric 202. Conversely, when qa(t), qb(t), or qc(t)

decreases below any of the programmable thresholds Qa(1)-Qa(n), Qb(1)-Qb(n), or Qc(1)-Qc(n), respectively, then at that time formatter 252 generates and sends the first, second, or third variable-rate control code to line cards 204, 206, or 208 respectively, instructing it to increase the rate at which it transmits data for storage in the first, second, or third buffer, respectively, of switching fabric 202. Since switching fabric 202 is coupled to line cards 204 through 208 via downlinks 228, 232, and 236, respectively, two or more of the first, second, and third variable-rate control codes may be transmitted simultaneously.

Fabric 202 as shown in FIG. 2a may support two or more types of data transmission to the line cards. For example, switching fabric 202 may support high and low priority data traffic in a non-blocking manner where high priority traffic can pass low priority traffic. High priority traffic passing low priority traffic should not be limited to discrete packets. For example, suppose end device end device 222 (FIG. 2a) is sending low priority traffic to end device 210 via fabric 202 when end device 216 begins sending high priority traffic to end device 210 via fabric 202. Initially, fabric 202 chooses to send packets from line card 208 since no high priority traffic is being sent to end device 210. But, when the high priority traffic appears from end device 216, fabric 202 can interrupt a low priority packet sent from line card 222 and send the entire high priority packet from end device 216, then resume transmission of the low priority packet.

Figure 2C:
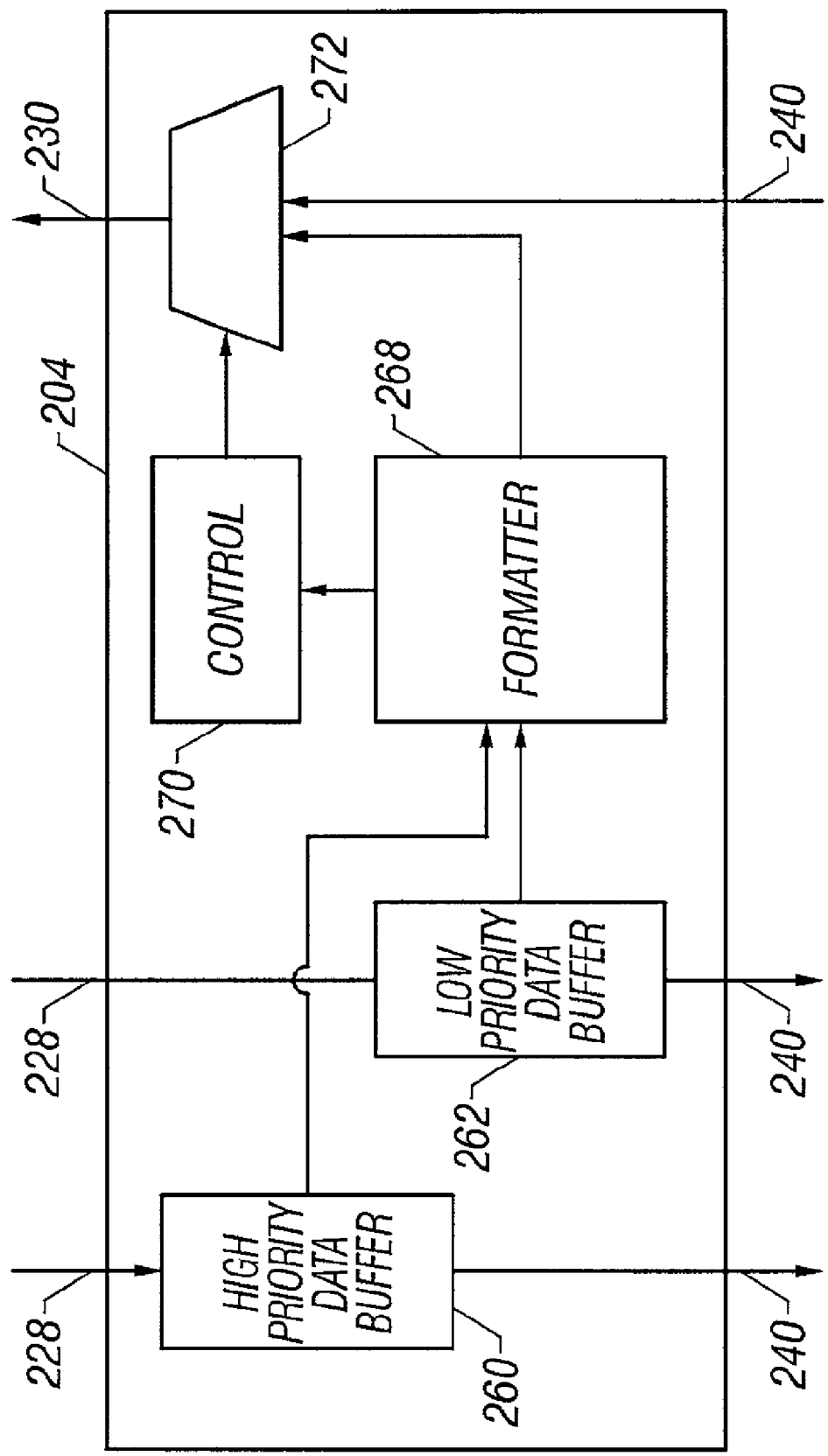

FIG. 2c shows a line card 204 which may find use in the system 200 shown in FIG. 2a. In contrast to the line card 204 shown in FIG. 2b, line card 204 shown in FIG. 2c includes two data buffers 260 and 262 which may be used to store distinct types of data transmitted from switching fabric 202. More particularly, data buffer 260 may be used to store data transmitted from switching fabric 202 having the highest priority, while data buffer 262 may store data transmitted from switching fabric 202 having the lowest priority. It is noted that the line card shown in FIG. 2c may include further receiving buffers for storing data having priority which lies between the highest and lowest priorities mentioned above.

Line card 204 shown in FIG. 2c includes a formatter 268 coupled to a control circuit 270 and multiplexer 272. Formatter 268 is configured to generate control codes, including high and low priority variable-rate control codes, for controlling operational aspects of the switching fabric 202. The high and low priority variable-rate control codes are used to control the rate at which high and low priority data is transmitted to the first data buffer 260 and second data buffer 262, respectively. Multiplexer 272, in response to control circuit 270, couples the output of formatter 268 to uplink 230 when formatter 268 generates one of its control codes. Otherwise, multiplexer 272 couples local bus 240 to uplink 230 so that data may be transmitted to switching fabric 202. Although not shown in FIG. 2c, line card 204 includes a switch for selectively coupling the inputs of buffers 260 and 262 to downlink 228 depending on whether data received by the switch is designated high priority or low priority.

In FIG. 2c, formatter 268 is configured to receive information relating to the quantity of data stored within the buffers 260 and 262. For purposes of explanation formatter 268 will be described as receiving $q1(t)$ and $q2(t)$ from buffers 260 and 262, respectively, where $q1(t)$ and $q2(t)$ represent the quantity of data stored in buffers 260 and 262, respectively, at time t, it being understood that formatter may be configured to generate $q1(t)$ and $q2(t)$ based on information provided by buffers 26a and 262. In response to receiving $q1(t)$ and $q2(t)$, formatter 268 compares $q1(t)$ and $q2(t)$ to programmable thresholds Q1(1)-Q1(n) and Q2(1)-Q2(n) contained therein.

When $q1(t)$ or $q2(t)$ increases beyond any of the programmable thresholds Q1(1)-Q1(n), or Q2(1)-Q2(n), respectively, then at that time formatter 268 generates and sends the high or low priority variable-rate control code, respectively, to switching fabric 202, instructing it to slow the rate at which it transmits high or low priority data for storage in buffer 260 or 262, respectively. Conversely, when $q1(t)$ or $q2(t)$ decreases below any of the programmable thresholds Q1(1)-Q1(n), or Q2(1)-Q2(n), respectively, then at that time formatter 268 generates and sends the high or low priority variable-rate control code, respectively, to switching fabric 202, instructing it to increase the rate at which it transmits high or low priority data for storage in buffer 260 or 262, respectively. Obviously, it is possible that $q1(t)$ and $q2(t)$ may simultaneously increase beyond or decrease below programmable thresholds Q1(1)-Q1(n), or Q2(1)-Q2(n), respectively. In this situation, formatter 268 may simultaneously generate high and low priority variable-rate control codes. Line card 204 is coupled to switching fabric 202 by a single uplink 230. As a result, only 1.5 one of the high and low priority variable-rate control codes may be transmitted to switching fabric 202 during a transmission cycle on uplink 230. In this situation, the formatter may send the high and low priority variable-rate control codes in consecutive transmit cycles on uplink 230. Alternatively, where $q1(t)$ and $q2(t)$ simultaneously increase beyond or decrease below programmable thresholds Q1(1)-Q1(n), or Q2(1)-Q2(n), respectively, formatter 268 may generate a control word which contains a first and second variable-rate control codes, where the first control variable-rate code instructs fabric 202 to increase or decrease the rate at rate at which it transmits high data for storage in buffer 260, and where the second control variable-rate code instructs fabric 202 to increase or decrease the rate at rate at which it transmits low data for storage in buffer 262. This control word may be sent to the fabric in a single cycle thereby eliminating the need to send separate control codes in succeeding cycles.

Figure 3:
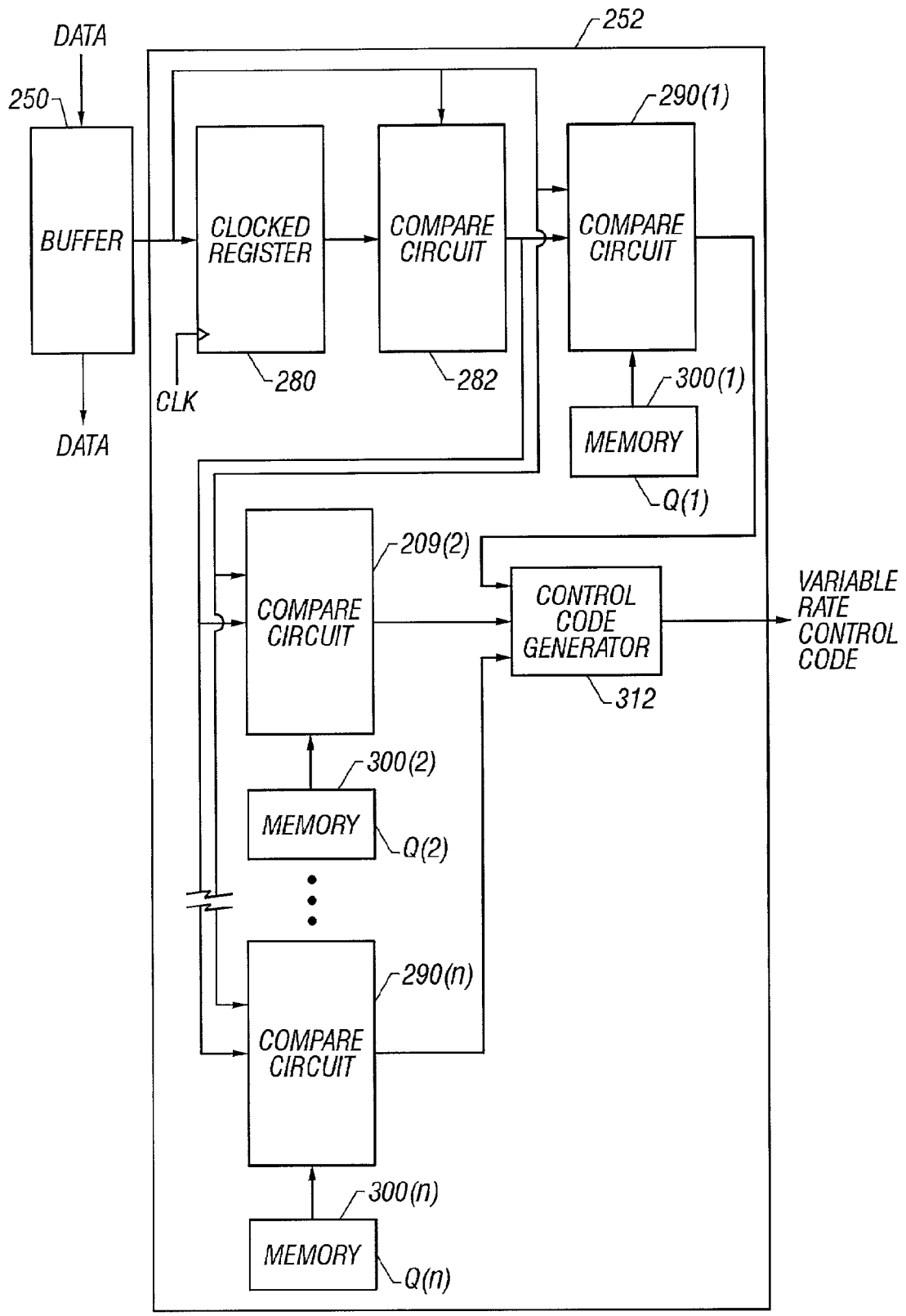

FIG. 3 illustrates one embodiment of formatter 252 shown in FIG. 2b. It is noted that formatter 252 may include additional circuitry for performing other functions. Formatter 252 is shown to include a clocked register 280, compare circuit 282, compare circuits 290(1) through 290(n), memory devices 300(1) through 300(n), and control code generator 312.

Figure 4:
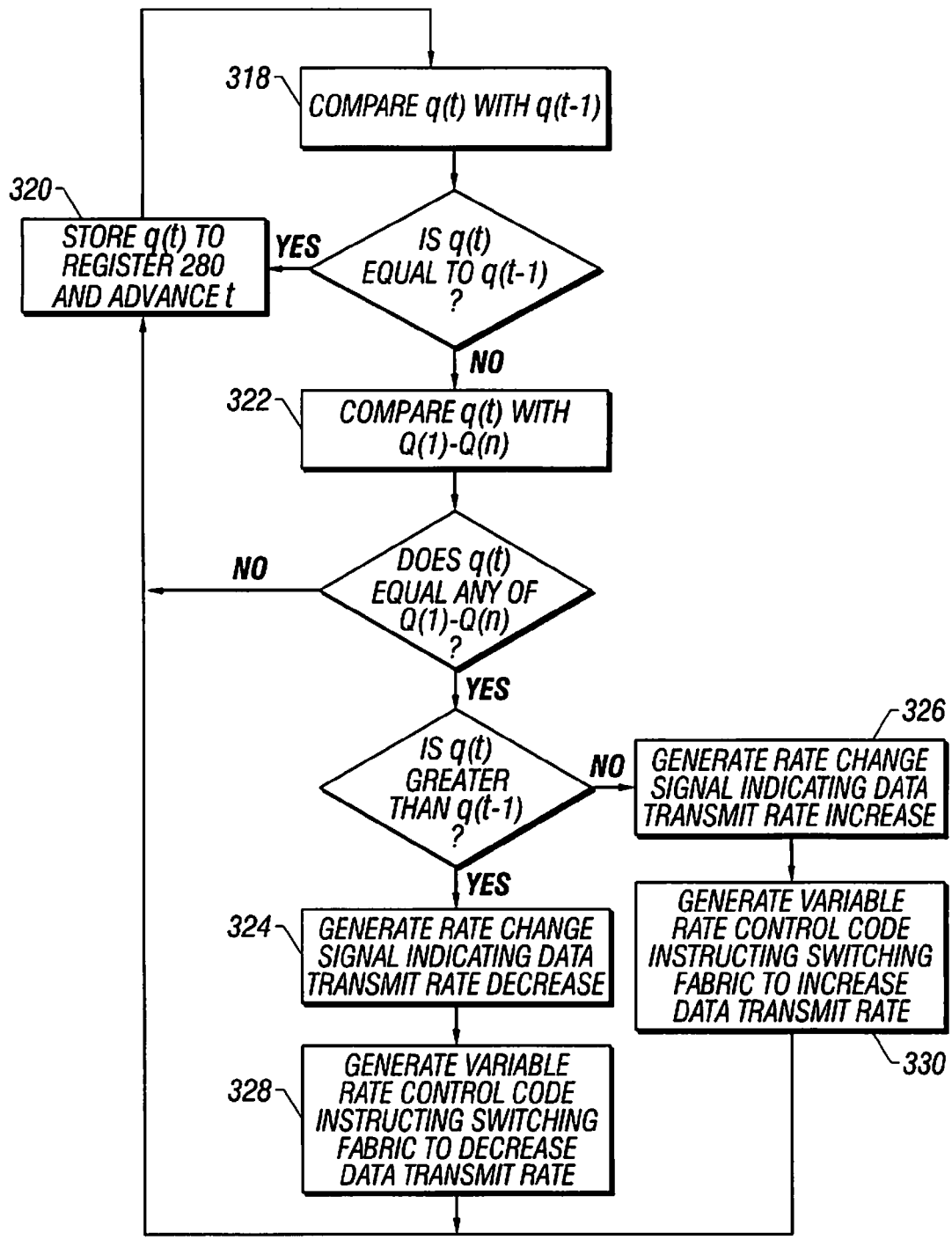
FIG. 4 is a flow chart illustrating operational aspects of the formatter shown in FIG. 3.

Operational aspects of one embodiment of the formatter 252 will be described with reference to the flow chart shown in FIG. 4. At step 316, q(t), the quantity of data stored in buffer 250 at time t, is provided to clocked register 280, compare circuit 282, and compare circuits 290(1) through 290(n). At the same time, q(t−1), the quantity of data stored in buffer 250 in the previous clock cycle t−1, is provided by clocked register 280 to compare circuit 282. At step 318, compare circuit 282 compares q(t) to q(t−1). If q(t) is equal to q(t−1), then the process ends with step 320 where q(t) is clocked into clocked register 280. However, if q(t) does not equal q(t−1), then, compare circuit generates a signal, which is provided to compare circuits 290(1) through 290(n), indicating that q(t) is either greater than or less than q(t−1). The process proceeds to step 322, where compare circuits 290(1) through 290(n) compare q(t) to thresholds Q(1) through Q(n), respectively, stored in memories 290(1) through 290(n), respectively. If q(t) does not equal any of the thresholds Q(1) through Q(n), then the process ends with step 320. However, if q(t) equals one of the thresholds Q(1) through Q(n), then one of the compare circuits 290(1) through 290(n) generates either a rate change signal indicating that the data transmit rate between line card 204 and switching fabric 202 should be increased or decreased depending on whether the signal provided by compare circuit 282 indicates q(t) is greater than q(t−1) or less than q(t−1), respectively. More particularly, when one of the compare circuits 290(1) through 290(n) detects equality between q(t) and one of the thresholds Q(1) through Q(n), the one of the compare circuits 290(1) through 290(n) generates the rate change signal indicating that the data transmit rate between line card 204 and switching fabric 202 should be increased if q(t) is greater than q(t−1) as shown in step 324 or decreased if q(t) is less than q(t−1) as shown in step 326, respectively.

Control code generator 312 receives the rate change signal from one of the compare circuits 290(1) through 290(n). Although not shown within the figures, control code generator 312 may include a programmable memory storing data transmit rate values R(1) through R(n) corresponding to the threshold values Q(1) through Q(n), respectively. Data transmit rate values R(1) through R(n) define differing rates for transmitting data between switching fabric 202 and line card 204. Data transmit rate values R(1) through R(n) vary between R(1) which may equal the fullest possible rate at which data can be transmitted between switching fabric 202 and line card 204, to R(n) which may equal zero transmission rate. Moreover, control code generator 312 is configured to "remember" the current transmit rate, i.e., the rate at which data is being transmitted between switching fabric 202 and line card 204 at time t. In one embodiment, control code generator 312 remembers the current transmit rate using a pointer pointing to one of the data transmit rate values R(1) through R(n). In this embodiment, the data transmit rate value currently being pointed to by the pointer at time t is defined as the current data transmit rate.

Figure 5:
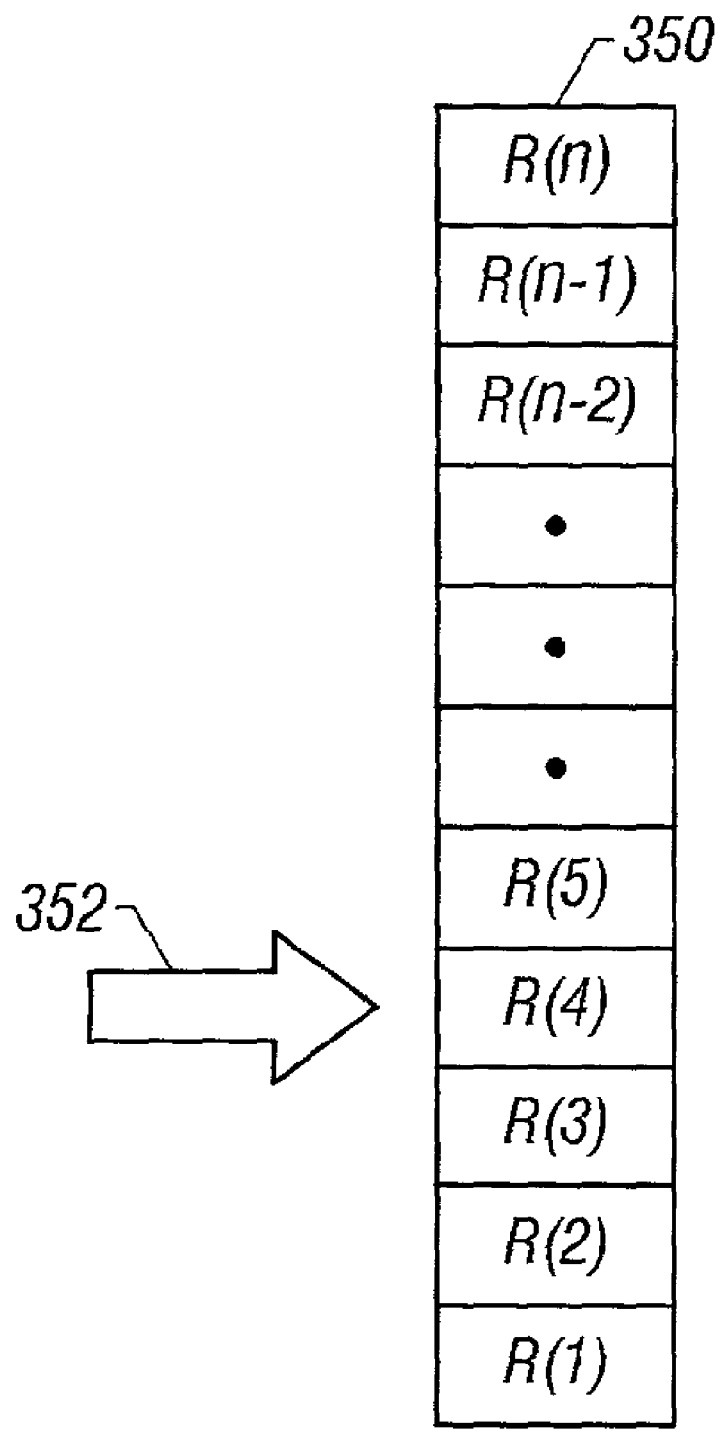
FIG. 5 illustrates a programmable memory for storing transmit rate values R(1) through R(n).

FIG. 5 illustrates, in block diagram form, an exemplary programmable memory 350 storing data transmit rate values R(1) through R(n) with a pointer 352 pointing to current data transmit rate R(4). With continuing reference to FIGS. 3 and 4, when control code generator 312 receives a rate change signal from one of the compare circuits 290(1) through 290(n), control code generator, in one embodiment, control code generator moves the position of pointer 352 up one or down one position depending on whether signal from one of the compare circuits 290(1) through 290(n) indicates that the data transmit rate should be increased or decreased, respectively. For example, if the rate change signal from one of the compare circuits 290(1) through 290(n) indicates that the data transmit rate should be increased, then control code generator 312 moves the pointer 352 down to R(3) in FIG. 5. If, on the other hand, the rate change signal from one of the compare circuits 290(1) through 290(n) indicates that the data transmit rate should be decreased, then control code generator 312 moves the pointer 352 up to R(5) in FIG. 5. Further, in response to receiving the rate change signal, control code generator 312 generates and sends a variable-rate control code to switching fabric 202 as shown in step 328 or 330 of FIG. 4. This variable-rate control code includes the data transmit rate value (e.g., R(3) or R(5)) newly pointed to by pointer 352. Switching fabric 202 receives the variable-rate control code and adjusts the data transmission rate between it and the line card 204 in accordance with the data transmit rate value contained in the received variable-rate control code.

In an alternative embodiment not shown in the figures, line card 204 may include a formatter F, a data buffer B that receives data from the fabric 202, a first set of quantity comparators QC(1) through QC(n), a clocked register CR for storing a rate code r(t−1), and a rate comparator RC. Initially, r(t−1) in CR is set to the full speed, R(1). Thereafter on every clock cycle the comparators QC(1) through QC(n) compare q(t), the quantity of data in buffer B at time t, with the Q(2) through Q(N), respectively, to determine what the current rate code r(t) should be. Suppose that q(t) is greater than Q(2)-Q(4) and less than Q(5)-Q(n). Then the desired rate code r(t) would be equal to R(4). Next RC compares r(t) with r(t−1) stored in CR. If r(t) with r(t−1) are equal then no new rate code needs to be sent to fabric 202. If, for example at time t, r(t−1) in CR is R(3) and r(t) is R(4) then g(t) just moved above the Q(4) boundary and it is time to send the R(4) code to fabric 202. Conversely, suppose that r(t−1) is R(5); in this case q(t) just slipped below Q(5) and it is time to send the R(4) code to the fabric. After the r(t) and r(t−1) comparisons are done the value of r(t) is stored into CR and t advances. This embodiment is described as being employed in a line card. This embodiment should not be limited thereto. Rather, this embodiment may find application in the switching fabric to moderate the rate at which a line card transmits data to the switching fabric.

The formatter 252 of FIG. 2b may also include circuitry or an algorithm which prevents frequent transmission of control codes to fabric 202 when the contents of buffer 250 oscillates around one of the predefined quantities Q(1)-Q(n). With Q(1)-Q(n) fixed—suppose that the q(t) increases to become one greater than Q(2). In this situation, R(2) is sent to the fabric 202. In the next clock cycle, buffer 250 empties by one line so that q(t) is no longer greater than Q(2). In response, R(1) is sent to fabric 202. At the next clock cycle, one line is stored in the buffer, so q(t) exceeds Q(2); and R(2) is again sent to the fabric 202. If q(t) is oscillating around the value Q(2), rate codes will be frequently sent to fabric 202.

One way to avoid frequently sending rate codes to fabric 202 due to q(t) oscillation around one of the programmed quantities Q(1) through Q(n), is to dynamically modify the value Q(x) used for comparison with q(t) as the Q(x) threshold is crossed by q(t) from below. With reference to the embodiment in which line card 204 includes a formatter F, a data buffer B that receives data from the fabric 202, a first set of quantity comparators QC(1) through QC(n), a clocked register CR for storing a rate code r(t−1), and a rate comparator RC, suppose q(t) exceeds Q(2). The rate code R(2) is sent to the fabric 202 as before, but now the value of Q(2) used in the comparators (and only the value of Q(2), not any other Q values) is changed by an amount Y set in a programmable register PR. At the next clock cycle the comparator QC(2) compares q(t) with [Q(2)−Y] instead of Q(2). For example, suppose Q(2) is initially programmed to 500, and Y is set to 25. When q(t) exceeds 500 the rate code R(2) is sent to fabric 202, but only when q(t) drops below 475 (which is Q(2)−Y) will R(1) be sent to fabric 202. In this manner small oscillations of q(t) around a Q(x) value will not cause different rate codes to be sent frequently to fabric 202. Note that the other Q(1) through Q(n) values other than the Q(x) just crossed are unaffected. If, for example, Q(3) is initially programmed to 580. If q(t) exceeds Q(2)=500, Q(2) is replaced with Q(2)-Y, and the R(2) code is sent, then the R(3) code will not be sent until q(t) exceeds 580, not when it exceeds 555. This method works in both directions. If q(t) rises from 0 to exceed 500, the q(t) comparison for that comparator is against the level 475. However once q(t) drops below 475, Q(2)=475 is replaced with 500 to avoid frequently sending different rate codes if the q(t) value now hovers around 475.

Although the present invention have been described in connection with several embodiments, the invention is not intended to be limited to the specific forms set forth herein, but on the contrary, it is intended to cover such alternatives, modifications, and equivalents as can be reasonably included with in the spirit and scope of the invention as defined by the appended claims.

What is claimed is:

1. A method comprising:
receiving data from a transmitting device transmitting data at a first non-zero rate to a memory for storage therein during a first period of time;
generating a first data quantity value representing a quantity of data stored in the memory at a first point in time, comparing the first data quantity value to a first predetermined value;
causing the transmitting device to transmit data at a second non-zero rate to the memory for storage therein during a second period of time, in response to the comparing;
modifying the first predetermined value in response at least in part to the comparing the first data quantity value to the first predetermined value;
wherein the second period of time is subsequent to the first period of time; and wherein the second non-zero rate is greater than the first non-zero rate;
wherein the modifying the first predetermined value comprises subtracting a set value from the first predetermined value thereby generating a new first predetermined value.

2. The method of claim 1 wherein the memory device comprises a FIFO buffer.

3. The method of claim 1 wherein the transmitting device is contained in a switching fabric, wherein the memory is contained in a line card coupled to the switching fabric via a data link, and wherein the transmitter transmits data via the data link to the memory for storage therein.

4. The method of claim 1 further comprising:
generating a rate control signal; and
transmitting the rate control signal to the transmitting device to instruct the transmitting device to stop transmitting data at the first non-zero rate and start transmitting data at the second non-zero rate;
wherein the transmitting device stops transmitting data to the memory device at the first data rate and starts transmitting data to the memory device at the second data rate in response to the transmitting device receiving the rate control signal.

5. The method of claim 4 further comprising:
comparing the first data quantity value to a plurality of predetermined values, wherein the first predetermined value is one of the plurality of first predetermined values;
wherein the rate control signal is generated in response to comparing the first data quantity value to the plurality of predetermined values.

6. The method of claim 4 further comprising:
generating a second data quantity value representing a quantity of data stored in the memory device at a second point in time, wherein the second point in time is prior to the first point in time;
comparing the first data quantity value to the second data quantity value;
wherein the rate control signal is generated only if the first data quantity value is not equal to the second data quantity value.

7. The method of claim 1 wherein generating the first data quantity value comprises:
generating total data input count at the first point in time, wherein the total data input count represents a quantity of data input to the memory device during a period of time ending in the first point in time;
generating total data output count at the first point in time, wherein the total data output count represents a quantity of data output from the memory device during the period of time ending in the first point in time;
subtracting the total data output count from total data input count.

8. The method of claim 1 wherein the causing comprises:
transmitting a rate control signal to the transmitting device to instruct the transmitting device to stop transmitting data at the first non-zero rate and start transmitting data at the second non-zero rate, wherein
the transmitting device stops transmitting data to the memory device at the first data rate and starts transmitting data to the memory device at the second data rate in response to the transmitting device receiving the rate control signal.

9. The method of claim 8 further comprising:
comparing the first data quantity value to a plurality of predetermined values, wherein the first predetermined value is one of the plurality of first predetermined values;
wherein the rate control signal is generated in response to comparing the first data quantity value to the plurality of predetermined values.

10. The method of claim 1 further comprising
the transmitting device transmitting data at a third non-zero rate to the memory for storage therein during a third period of time;
wherein the third period of time is subsequent to the second period of time, and wherein the third non-zero rate is greater than the second non-zero rate.

11. An apparatus comprising:
a memory device configured to receive data from a transmitting device for storage therein;
a first circuit configured to generate and transmit a rate control signal instructing the transmitting device to stop transmitting data to the memory device at a first non-zero rate and to begin transmitting data to the memory device at a second non-zero rate wherein the second non-zero rate is greater than the first non-zero rate;
a second circuit for generating a first data quantity value representing a quantity of data stored in the memory device at a first point in time;
a first comparing circuit for comparing the first data quantity value to a first predetermined value, wherein the first circuit generates the rate control signal in response to the comparing; and
a circuit for modifying the first predetermined value in response at least in part to the comparing the first data quantity value to the first predetermined value;
wherein the modifying the first predetermined value comprises subtracting a set value from the first predetermined value thereby generating a new first predetermined value.

12. The apparatus of claim 11 wherein the memory device comprises a FIFO buffer.

13. The apparatus of claim 11 further comprising the transmitting device, wherein the transmitting device is contained in a switching fabric, wherein the memory is contained in a line card coupled to the switching fabric via a data link, and wherein the transmitter transmits data via the data link to the memory for storage therein.

14. The apparatus of claim 11 further comprising:
a plurality of comparing circuits, each one of which is configured to compare the first data quantity value to a respective one of a plurality of predetermined values, wherein the first comparing circuit is one of the plurality of comparing circuits, and wherein the first predetermined value is one of the plurality of first predetermined values;
wherein the first circuit generates the rate control signal in response to comparing the first data quantity value to the plurality of predetermined values.

15. The apparatus of claim 11 further comprising:
a third circuit for generating a second data quantity value representing a quantity of data stored in the memory device at a second point in time, wherein the second point in time is prior to the first point in time;
a second comparing circuit for comparing the first data quantity value to the second data quantity value;
wherein the first circuit generates the rate control signal only if the first data quantity value is not equal to the second data quantity value.

16. The apparatus of claim 15 wherein the first and second circuits are the same circuits.

17. An apparatus comprising:
a memory device configured to receive data from a transmitting device for storage therein;
a first means for generating and transmitting a rate control signal instructing the transmitting device to stop transmitting data to the memory device at a first non-zero rate and to begin transmitting data to the memory device at a second non-zero rate wherein the second non-zero rate is greater than the first non-zero rate;
a second means for generating a first data quantity value representing a quantity of data stored in the memory device at a first point in time; a third means for comparing the first data quantity value to a first predetermined value; and
a means for modifying the first predetermined value in response at least in part to the comparing the first data quantity value to the first predetermined value;
wherein the first means generates the rate control signal in response to the comparing;
wherein the modifying the first predetermined value comprises subtracting a set value from the first predetermined value thereby generating a new first predetermined value.

18. The apparatus of claim 17 wherein the memory device comprises a FIFO buffer.

19. The apparatus of claim 17 further comprising the transmitting device, wherein the transmitting device is contained in a switching fabric, wherein the memory is contained in a line card coupled to the switching fabric via a data link, and wherein the transmitter transmits data via the data link to the memory for storage therein.

20. The apparatus of claim 17 further comprising:
a fourth means for generating a second data quantity value representing a quantity of data stored in the memory device at a second point in time, wherein the second point in time is prior to the first point in time;
a fifth means for comparing the first data quantity value to the second data quantity value;
wherein the first means generates the rate control signal only if the first data quantity value is not equal to the second data quantity value.

21. A method comprising:
receiving data from a transmitting device transmitting data at a first non-zero rate to a memory for storage therein during a first period of time;
generating a rate control signal by
generating a first data quantity value representing a quantity of data stored in the memory at a first point in time,
comparing the first data quantity value to a first predetermined value, wherein the rate control signal is generated in response to the comparing;
causing the transmitting device to transmit data at a second non-zero rate to the memory for storage therein during a second period of time, wherein
the causing comprises transmitting the rate control signal to the transmitting device; and
modifying the first predetermined value in response at least in part to the comparing the first data quantity value to the first predetermined value;
wherein the second period of time is subsequent to the first period of time; and
wherein the second non-zero rate is less than the first non-zero rate;
wherein the modifying the first predetermined value comprises subtracting a set value from the first predetermined value thereby generating a new first predetermined value.

22. The method of claim 21 further comprising:
transmitting the rate control signal to the transmitting device to instruct the transmitting device to stop transmitting data at the first non-zero rate and start transmitting data at the second non-zero rate; and
wherein the transmitting device stops transmitting data to the memory device at the first data rate and starts transmitting data to the memory device at the second data rate in response to the transmitting device receiving the rate control signal.

23. The method of claim 22 further comprising:
comparing the first data quantity value to a plurality of predetermined values, wherein the first predetermined value is one of the plurality of first predetermined values;
wherein the rate control signal is generated in response to comparing the first data quantity value to the plurality of predetermined values.

24. An apparatus comprising:
a memory device configured to receive data from a transmitting device for storage therein;
a first circuit configured to generate and transmit a rate control signal instructing the transmitting device to stop transmitting data to the memory device at a first non-zero rate and to begin transmitting data to the memory device at a second non-zero rate, wherein the second non-zero rate is less than the first non-zero rate;
a second circuit for generating a first data quantity value representing a quantity of data stored in the memory device at a first point in time;
a first comparing circuit for comparing the first data quantity value to a first predetermined value, wherein the first circuit generates the rate control signal in response to the comparing; and
a circuit for modifying the first predetermined value in response at least in part to the comparing the first data quantity value to the first predetermined value;
wherein the modifying the first predetermined value comprises subtracting a set value from the first predetermined value thereby generating a new first predetermined value.

* * * * *